United States Patent [19]
Haussmann

[11] Patent Number: 4,737,987
[45] Date of Patent: Apr. 12, 1988

[54] CIRCUIT FOR EVALUATING CALL SIGNALS IN A TELECOMMUNICATION SYSTEM

[75] Inventor: Erwin Haussmann, Igensdorf, Fed. Rep. of Germany

[73] Assignee: U.S. Philips Corporation, New York, N.Y.

[21] Appl. No.: 826,176

[22] Filed: Feb. 5, 1986

[30] Foreign Application Priority Data

Feb. 9, 1985 [DE] Fed. Rep. of Germany ....... 3504512

[51] Int. Cl.[4] .............................................. H04M 1/00
[52] U.S. Cl. ...................................... 379/373; 328/138
[58] Field of Search ............. 179/84 R, 84 A, 84 VF; 379/372, 373, 418, 82; 328/138

[56] References Cited

U.S. PATENT DOCUMENTS

| | | | |
|---|---|---|---|
| 3,146,432 | 8/1964 | Johnson | 328/138 X |
| 3,454,720 | 7/1969 | Minchenko | 179/84 VF |
| 3,594,588 | 7/1971 | Evans et al. | 179/84 VF |
| 4,066,848 | 1/1978 | Darwood | 179/84 R |
| 4,390,843 | 6/1983 | Betts et al. | 179/84 R |
| 4,427,948 | 1/1984 | Rinaldi | |
| 4,536,618 | 8/1985 | Serrano | 179/84 R |

FOREIGN PATENT DOCUMENTS 105754  6/1976  Japan ................................... 328/138

*Primary Examiner*—James L. Dwyer
*Attorney, Agent, or Firm*—Thomas A. Briody; Jack Oisher; William J. Streeter

[57] ABSTRACT

A simple and inexpensive circuit for evaluating the level and frequency ranges of call signals in a telecommunication system. For level evaluation the circuit comprises a pair of oppositely poled threshold value switches and an opto-coupler connected thereto. For frequency evaluation the circuit further comprises at least two series-arranged retriggerable monostable elements whose outputs are connected to a logic circuit. The dwell times of the monostable elements in response to an applied signal establish the frequency range within which a call signal can actuate the output of the logic circuit, thereby indicating whether the signal is within that range.

3 Claims, 2 Drawing Sheets

CIRCUIT FOR EVALUATING CALL SIGNALS IN A TELECOMMUNICATION SYSTEM

BACKGROUND OF THE INVENTION

1. Field of the Invention

The invention relates to an evaluation circuit for call signals in a telecommunication system, and particularly to a circuit for evaluating the level and frequency range of such signals.

2. Description of the Prior Art

DE-SO No. 27 58 542 discloses a telephone exchange call circuit in which the level of an applied call signal is evaluated. To that end the exchange call circuit comprises an opto-coupler circuit connected to a rectifier bridge and to a parallel arrangement of a resistor and a capacitor. The opto-coupler provides electric isolation between the circuit portions effecting the evaluation of the received call signal and the circuit portions connected to the exchange call line. By means of a voltage divider arranged in the output circuit of the opto-coupler the threshold of the call signal level is determined, and an RC-arrangement is used for filtering the rectified call a.c. voltage.

The exchange call circuit defined in the foregoing has the disadvantage that it does not distinguish between frequencies located in the pass region of the low-pass filter (RC-arrangement) or between alternating and direct currents or alternating and direct voltages.

DE-OS No. 33 14 819 discloses a call detection circuit for a telephone subscriber's end station in which evaluation of both the level and frequency of a received call signal is effected. The level evaluation is effected by means of a threshold value switch and the frequency evaluation is effected by time discrimination using counters and an auxiliary clock from a clock source (at a frequency generated in the dialling tone generator).

This call detection circuit has the disadvantage that the circuit arrangement for level evaluation is expensive, an auxiliary clock pulse is required for frequency evaluation, and noise in the subscriber line between the exchange and the subscriber's end station is coupled-in due to switching edges of the signals at the output of the threshold value switch, at the counter output and at the voltage divider outputs.

SUMMARY OF THE INVENTION

An object of the invention is to provide a low-cost and uncomplicated evaluation circuit in which brief noise pulses or direct-axis components in the line voltage do not result in triggering of further switching operation.

The circuit arrangement according to the invention has the advantage that it consumes little power, that the circuit portions subsequent to the evaluation circuit are electrically isolated from the line (exchange line, subscriber line), that no auxiliary pulse is required and that direct-axis components of the voltage on the line do not result in faulty evaluations. By use of monostable multivibrator circuits in the frequency evaluation circuit, modification for different uses, for example for FSK-demodulation can be made simply by changing the dwell time of the multivibrator circuits.

If, switched Zener diodes are used for the threshold value switch, then a change in the positive or the negative threshold voltage can be made simply by substituting Zener diodes having different Zener voltages.

One embodiment of an evaluation circuit in accordance with the invention has the advantage that the signal-to-noise ratio between the useful level and the noise level is increased.

If the evaluation circuit is comprised of an AND-gate and a monostable multivibrator circuit connected thereto, then brief voltage drops in the output signal of the AND gate can be suppressed.

If such an AND-gate is comprised of two parallel-arranged diodes decoupling of the outputs of the monostable multivibrator circuit can be easily accomplished in a simple way.

BRIEF DESCRIPTION OF THE DRAWINGS

The invention will now be described in greater detail by way of example with reference to embodiments shown in the accompanying drawings. Therein

DESCRIPTION OF THE PREFERRED EMBODIMENTS

Figure 1:
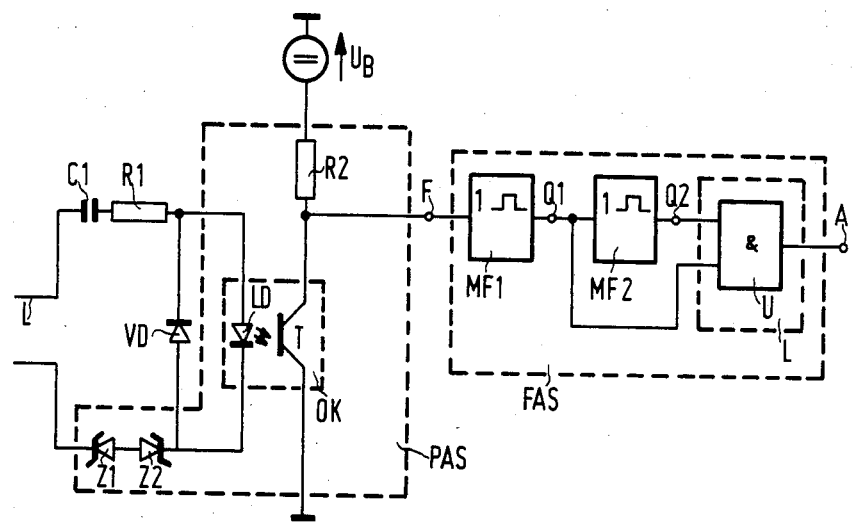
FIG. 1 shows a first embodiment and FIG. 2 shows a second embodiment of the evaluation circuit according to the invention.

FIG. 1 shows a first embodiment of the evaluation circuit according to the invention. If the evaluation circuit is used for level and frequency evaluation of call signals in telecommunication systems, then using this evaluation circuit, it can be determined whether an incoming exchange call comes within the predetermined level and frequency ranges.

The call signal supplied via a line L is applied to a level evaluation circuit PAS, whose output F is connected to a frequency evaluation circuit FAS. In telecommunication systems, especially in private branch exchanges, direct current is remotely fed to the subscriber's end station via the subscriber line L, and in the exchange the call alternating current is superposed on this direct current. Direct current isolation from the supply direct current is effected by means of a capacitor C1. The series arrangement formed by this capacitor C1 and a resistor R1 is provided in a wire, for example, the a-wire of the subscriber line L. The series impedance of R1 and C1 limits ringing current on the subscriber line L in the event of a short circuit and also limits the d.c. current. The cathode of a diode VD whose anode is connected to the cathode of two oppositely arranged Zener diodes Z1, Z2 is connected to a terminal of the resistor R1. The diode VD provides reverse voltage protection for the evaluation circuit.

The level evaluation in the level evaluation circuit PAS is effected by setting a threshold value by means of the threshold value switch, more specifically Zener diodes Z1, Z2. When the positive or the negative threshold value is exceeded, either diode VD or a light-emitting diode LD in an opto-coupler OK is energized. The light-emitting diode LD of the opto-coupler OK is arranged in parallel with the diode VD and acts as the base of a transistor T in the opto-coupler OK. The output terminals of the transistor T are connected to a reference potential and also by a resistor R2 to a terminal of a d.c. voltage source producing the supply voltage $U_B$. By means of the resistor $R_2$, which has a high resistance value, the operating point of the transistor T is set. A terminal of the resistor R2 is connected to the output F of the level evaluation circuit PAS.

Figure 3:
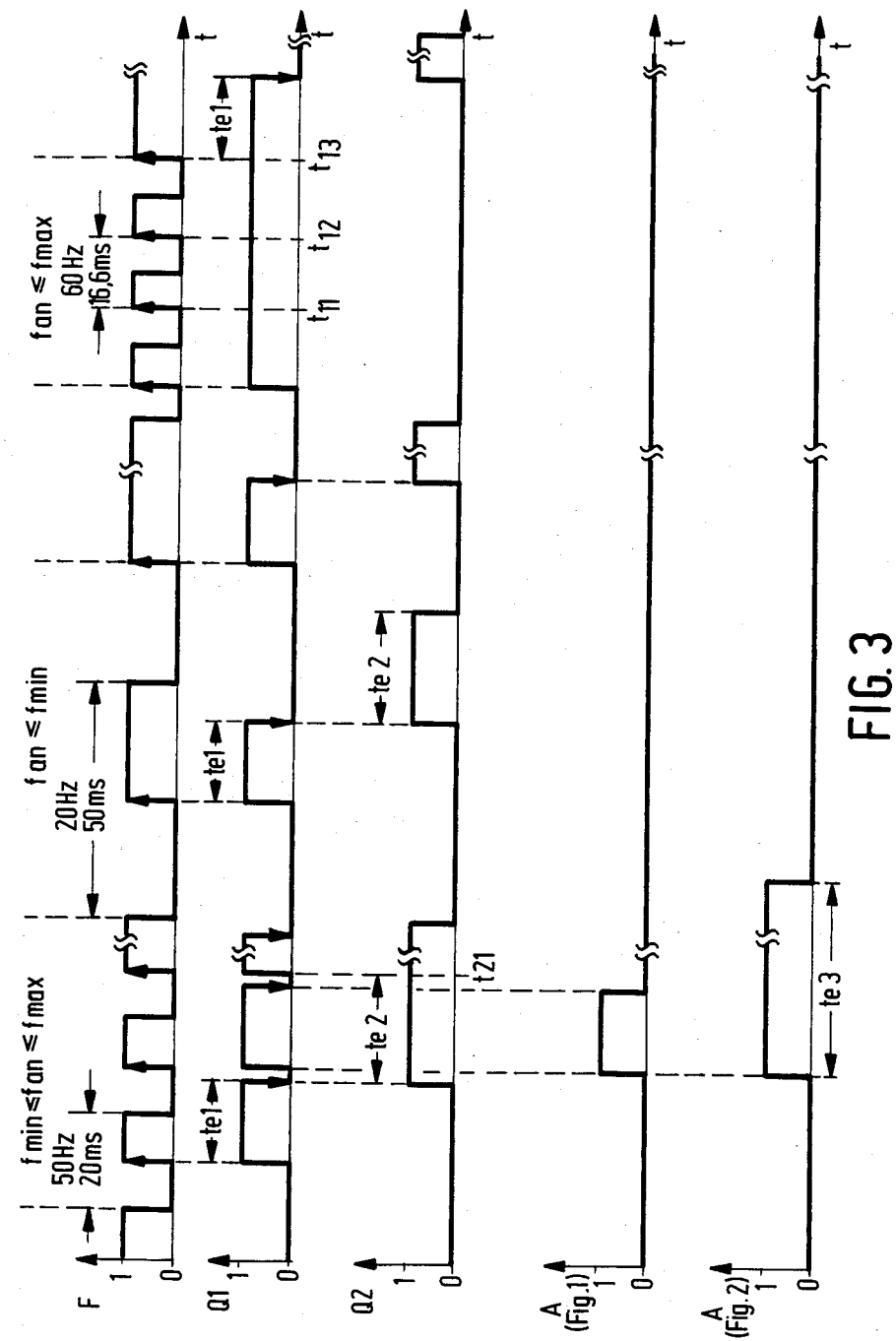
FIG. 3 shows the variations in the time of the signals occurring in the evaluation circuit according to the invention.

The frequency evaluation circuit FAS is comprised of at least two, series-arranged, retriggerable monostable elements MF1, MF2. The period of the input frequency fan (FIG. 3) is evaluated by means of the two monostable elements MF1, MF2. The dwell time te1 of the first monostable element FM1 determines the maximum frequency fmax and the dwell time te2 of the second monostable element MF2 determines the minimum frequency fmin of the frequencies located in the frequency range of the valid frequencies (FIG. 3). The outputs Q1 and Q2 of the monostable elements MF1 and MF2 are connected to a logic circuit L. In the simplest case, the outputsignals at the outputs Q1 and Q2 are combined in the logic circuit L with the aid of an AND-gate U. A signal containing the information whether the applied call signal is located within the predetermined level and frequency ranges can be taken from the output A of the frequency evaluation circuit FAS.

The mode of operation of the above-described circuit arrangement of FIG. 1 will now be described in greater detail with reference to the time-variation of the the signals occurring in the evaluation circuit according to the invention, which signals are shown in FIG. 3.

The ascending edge of the signal at the output F of level evaluation circuit PAS triggers the first monostable element MF1. The dwell time te1, during which the logic-1-state exists at the output of the first monostable element MF1, corresponds to the period of the maximum frequency fmax which is to be recognized as valid. That is to say, the following equation holds:

$$te1 = 1/fmax$$

The second monostable element MF2, which is connected to the output Q1 of the first monostable element MF1, is triggered by the descending edge of the output signal of the first monostable element MF1. The dwell time te2 of the second monostable element MF2 is obtained in accordance with the following equation:

$$te2 = 1/fmin - te1$$

For the input frequency fan there are three different cases.

1. The input frequency fan is less than fmin.

The first monostable element MF1 is triggered by the ascending edge of the signal at the output F of the level evaluation circuit PAS, and then changes from the logic-1-state to the logic-0-state after the dwell time te1 has ended. The second monostable element MF2 is triggered in response to this change of state. As during the dwell time te2 of the second logic-1-state of the second monostable element MF2 no further enable or trigger signal is received from the first monostable element MF1, the signal at the output A of the frequency evaluation circuit FAS does not change from its logic-0-state after the dwell time te2 as ended.

2. The input frequency fan is located in the frequency range F min ≦ Fan < Fmax

In response to the descending edge of the signal at the output Q1 of the first monostable element MF1 the second monostable element MF2 is triggered. During the dwell time te2 of the second monostable element MF2, while the signal at its output Q2 has the logic-1-state, it is retriggered. The instant at which the second monostable element MF2 is retriggered is indicated in FIG. 3 by $t_{21}$ when element NF1 changes back to the logic-0-state. Because of the logic-one signals at the outputs Q1 and Q2 of the two monostable elements MF1 and MF2, the signal at the output A of the frequency evaluation circuit FAS changes from the logic-0-state to the logic-1-state. This change-of-state indicates that the input frequency fan is within the predetermined frequency range.

Figure 2:
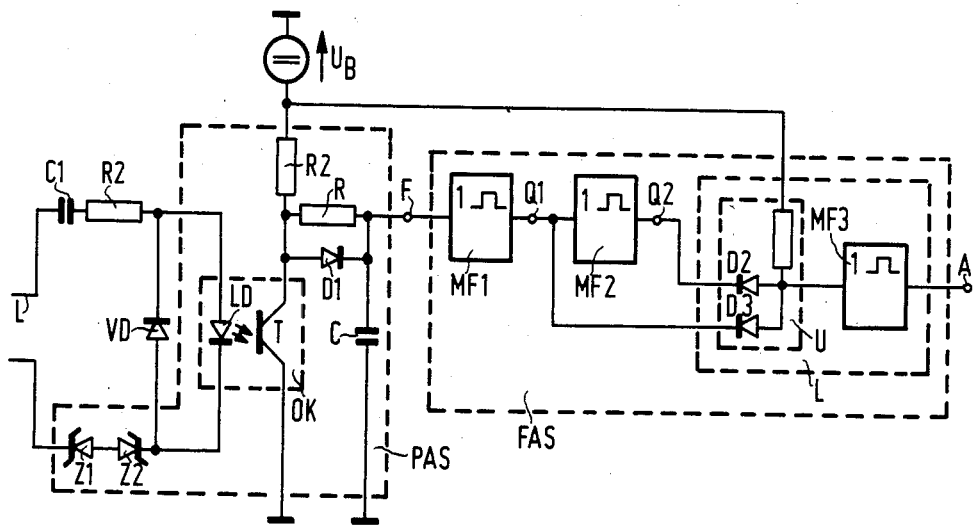

If, as is shown in FIG. 2, the logic circuit L comprises a third monostable element MF3, which is connected to the output of the AND-gate U, then brief voltage drops in the output signal of the AND-gate U can be eliminated. The third monostable element MF3 is triggered at the occurrence of the logic-1-state at the output of the AND-gate U, so that at its output, the output A of the frequency evaluation circuit FAS, the output signal also assumes the logic-1-state. If the dwell time te3 of the third monostable element MF3 is chosen such that the following equation holds:

$$te3 \geq 1/Fmin$$

the third monostable element MF3 will not change its significant state during the signal period and an undisturbed output will be produced. A capacitor may alternatively be used instead of the third monostable element MF3.

3. The input frequency fan equals or exceeds fmax.

In response to successive ascending edges of the signal at the output F of the level evaluation circuit PAS, the first monostable element MF2 is retriggered more than once during the duration of its dwell time te1, so that the dwell time te1 is again restarted (for example, at instants $t_{11}$, $t_{12}$, $t_{13}$). The signal at the output Q1 of the first monostable element MF1 therefore does not change from its logic-1-state, so that the second monostable element MF2 does not receive a descending edge enable pulse. A signal having the logic-0-state is produced OK from the output A of the evaluation circuit (FIG. 1 and also FIG. 2), which indicates that the input frequency fan is not located within the frequency range.

If, as is shown in FIG. 2, a resistor R in parallel with a diode D1 is connected to the reference potential by a capacitor C which is arranged between the output F of the level evaluation circuit PAS and the output circuit of the opto-coupler OK, then the signal-to-noise ratio between the useful signal and the line noise level can be increased.

The above-described evaluation circuit is suitable for use in many cases, for example for detecting the 425 Hz audible tone in a FSK demodulator or such like. As the power requirement of the evaluation circuit according to the invention when implemented in CMOS technique is low, it is possible to replace the current supply by means of a current supply derived by rectification of the applied dialling a.c. voltage in the subscriber's end station. In contemporary telephone sets which include a microprocessor for controlling displays, selector arrangements and stores, the function of the logic circuit L may alternatively be performed by the microprocessor. The determination of the dwell times te1, te2 and te3 of the monostable elements MF1, MF2 and MF3 can effectively be realized by programming of the microprocessor.

What is claimed is:

1. In a circuit for evaluating the level and frequency of call signals received from a telecommunication line, such circuit comprising a signal level evaluation circuit for receiving such call signals from the telecommunication line and a frequency evaluation circuit connected to the output of the level evaluation circuit; the improvement characterized in that:

the level evaluation circuit comprises a pair of oppositely poled Zener diodes connected in series to the telecommunication line and which are coupled to a light-emitting diode in an opto-coupler having an output terminal, whereby only call signals which exceed the threshold value of said diodes are coupled to said opto-coupler output terminal;

the level evaluation circuit further comprises a resistor connected between the output of the level evaluation circuit and the output terminal of the opto-coupler, which resistor is arranged in parallel with a third diode and is connected to a reference potential by a capacitor;

the frequency evaluation circuit comprises at least two retriggerable monostable elements each having an input and an output, the input of the first monostable element being connected to said first output terminal, the output of the first monostable element being connected to the input of the second monostable element, and the outputs of both monostable elements being connected to inputs of a logic-AND gate having a second output terminal;

the first monostable element having a first dwell time corresponding to the period of a predetermined maximum frequency of the received call signals, and the second monostable element having a second dwell time corresponding to the difference between said first dwell time and the period of a predetermined minimum frequency of the received call signals, each of said elements producing an output signal during the dwell time thereof;

the logic-AND gate producing an output signal at said seond output terminal in response to concurrence of the output signals produced by both said monostable elements;

whereby the production of an output signal at said second output terminal signifies that a received call signal has a level exceeding said threshold value and a frequency within the range from said predetermined minimum frequency to said predetermined maximum frequency.

2. An evaluation circuit as claimed in claim 1, characterized in that said logic AND-gate is comprised of two further parallel-arranged diodes whose anodes are interconnected and whose cathodes are respectively connected to the outputs of the first and second monostable elements.

3. An evaluation circuit as claimed in claim 1, characterized in that the output of said logic AND-gate is connected to a third monostable element.

* * * * *